United States Patent [19]

Tokas

[11] 4,308,355
[45] Dec. 29, 1981

[54] PROCESS FOR TERPOLYMER POLYBLENDS HAVING HIGH GLOSS AND DUCTILITY

[75] Inventor: Edward F. Tokas, Kirkwood, Mo.

[73] Assignee: Monsanto Company, St. Louis, Mo.

[21] Appl. No.: 140,279

[22] Filed: Apr. 14, 1980

[51] Int. Cl.³ .............................................. C08L 51/04
[52] U.S. Cl. ......................................... 525/84; 525/76
[58] Field of Search .............................. 525/76, 80, 84

[56] References Cited

U.S. PATENT DOCUMENTS 3,449,471  6/1969  Weitzel et al. ......................... 525/86
3,557,251  1/1971  Tanaka et al. ......................... 525/84

Primary Examiner—J. Ziegler

Attorney, Agent, or Firm—Joseph S. Nelson; William J. Farrington; Paul D. Matukaitis

[57] ABSTRACT

The invention relates to a process for preparing terpolymer polyblends having high gloss and ductility in formed articles, wherein, rubber particles in an aqueous latex are reacted with an alkenyl aromatic, alkenyl nitrile and alkyl acrylate monomer formulation such that said rubber particles become grafted with at least a portion of said monomers while said monomers form a matrix terpolymer phase of said monomers followed by separating said matrix phase terpolymer and said grafted rubber particles from said latex as a terpolymer polyblend. The invention also relates to a composition of said process.

6 Claims, No Drawings

PROCESS FOR TERPOLYMER POLYBLENDS HAVING HIGH GLOSS AND DUCTILITY

BACKGROUND OF THE INVENTION

It is known to graft diene rubber particles in an aqueous latex with alkenyl aromatic and alkenyl nitrile monomers to form conventional ABS polyblends.

Such polyblends have used grafted rubber particles ranging from about 0.01 to 0.25 microns to obtain high gloss in formed articles. Polyblends having these small particles have not had high levels of toughness or high elongation at fail. U.S. Pat. No. 3,509,237 has taught that these deficiencies can be overcome by adding up to 30% by weight of grafted large rubber particles, based on total grafted rubber content of polyblend. Said particles having a size of about 0.8 to 2.0 microns or larger.

The use of small and large grafted rubber particles or broad distributions of grafted rubber particles does improve toughness, however, gloss is lowered in proportion to the amounts of large particles used to gain toughness.

It has now been discovered that small diene rubber particles contained in an aqueous latex can be grafted with a particular monomer formulation of alkenyl aromatic, alkenyl nitrile and alkyl acrylate monomers, having 1 to 20% by weight of said alkyl acrylate monomer, to form a terpolymer polyblend having high gloss and toughness. Rubber particles in the range of about 0.01 to 0.50 microns, preferably about 0.1 to 0.25 microns, can be used in the polyblend insuring high gloss in formed articles.

SUMMARY OF THE INVENTION

The invention relates to a process for preparing terpolymer polyblends having high gloss and toughness comprising the steps:
A. charging an aqueous latex having diene rubber particles dispersed therein to a reaction zone,
B. mixing a monomer formulation of alkenyl aromatic, alkenyl nitrile and alkyl acrylate monomers with said latex, said alkyl acrylate monomer being present in an amount of about 1 to 20% by weight of said monomer formulation,
C. polymerizing said monomer in the presence of said latex such that, said rubber particles become grafted with at least a portion of said monomers while said monomers form a matrix terpolymer phase of said monomers,
D. separating said matrix terpolymer phase having said grafted rubber particles dispersed therein from said latex forming said terpolymer polyblend.

The invention relates to terpolymer polyblend composition comprising:
A. a matrix phase terpolymer of alkenyl aromatic, alkenyl nitrile and alkyl acrylate monomers,
B. a diene rubber phase grafted with said monomers as graft terpolymer and dispersed in said matrix phase as rubber particles having an average particle size of about 0.01 to 0.25 microns, said matrix and graft terpolymers having present about 1 to 20% by weight of said alkyl acrylate monomer, and
C. optionally a copolymer of said alkenyl aromatic and alkenyl nitrile monomers in an amount up to about 50% by weight of said matrix phase, said terpolymer polyblend having high gloss and ductility in formed articles.

PREFERRED EMBODIMENTS

The monomer formulation comprises, at least principally, a monoalkenylaromatic monomer, a ethylenically unsaturated nitrile monomer and an alkyl acrylate monomer. The monoalkenylaromatic monomer comprises at least one monomer of the formula:

where Ar is selected from the group consisting of phenyl, halophenyl, alkylphenyl and alkylhalophenyl and mixtures thereof and X is selected from the group consisting of hydrogen and an alkyl radical of less than three carbon atoms.

Exemplary of the monomers that can be employed in the present process are styrene; alpha-alkyl monovinylidene monoaromatic compounds, e.g., alpha-methylvinyl toluene, etc.; ring-substitute alkyl styrenes, e.g., vinyl toluene, o-ethylstyrene, p-ethylstyrene, 2,4-dimethylstyrene, etc.; ring-substituted halostyrenes, e.g., o-chlorostyrene, p-chlorostyrene, o-bromostyrene, 2,4-dichlorostyrene, etc.; ring-alkyl, ring-halo-substituted styrenes, e.g., 2-chloro-4-methylstyrene, 2,6-dichloro-4-methylstyrene, etc. If so desired, mixtures of such monovinylidene aromatic monomers may be employed.

Exemplary of the unsaturated alkenyl nitriles which may be used in the interpolymers are acrylonitrile, methacrylonitrile, ethacrylonitrile and mixtures thereof.

Exemplary of the monomers which may be interpolymerized with the monoalkenylaromatic hydrocarbons and unsaturated nitriles are conjugated 1,3 dienes, e.g., butadiene, isoprene, etc.; alpha- or beta-unsaturated monobasic acids and derivatives thereof, e.g., acrylic acid, methyl acrylate, ethyl acrylate, butyl acrylate, 2-ethylhexyl acrylate, methacrylic acid and the corresponding esters thereof, acrylamide, methacrylamide; vinyl halides such as vinyl chloride, vinyl bromide, etc.; vinylidene chloride, vinylidene bromide, etc.; vinyl esters such as vinyl acetate, vinyl propionate, etc.; dialkyl maleates or fumarates such as dimethyl maleate, diethyl maleate, dibutyl maleate, the corresponding fumarates, etc. As is known in the art, the amount of these comonomers which may be included in the interpolymer will vary as the result of various factors.

In addition, the monomer formulation at the time of polymerization may include a preformed polymer or a partially polymerized material such as a partially polymerized monoalkenylaromatic hydrocarbon or interpolymer thereof.

The polymerizable monomer mixtures contain at least 20% by weight of the monoalkenylaromatic monomer and preferable at least 50% by weight thereof. They also contain at least 5% by weight of the unsaturated nitrile and preferably at least 10% by weight thereof. From the standpoint of highly advantageous commercial practice, the monomer formulations contain 20 to 95% and preferably 60 to 85% by weight of the vinylidene aromatic hydrocarbon and 80 to 5% and preferably 40 to 15% by weight of the unsaturated nitrile.

Water soluble catalysts that can be used are the alkali metal peroxides, persulfates, perborates, peracetates and percarbonates, preferably potassium persulfate and hydrogen peroxide. Such water soluble catalysts may be activated with reducing agents to form conventional redox systems. Here, the preferred reducing agent can be sodium bisulfite or salts of ferrous ions or reduced transitional metals such as cobalt, nickel and copper. A preferred redox system is made up of the ion couple of $Fe^{++}/S_2O_8^{--}/HSO_3^{-}$.

The catalyst is generally included within the range of 0.001 to 3.0% by weight and preferably on the order of 0.005 to 1.0% by weight of the polymerizable monomers depending primarily upon the monomer present.

As is well known, it is often desirable to incorporate molecular weight regulators such as mercaptans, halides and terpenes in relatively small percentages by weight, on the order of 0.001 to 1.0% by weight of the polymerizable material. In addition, it may be desirable to include relatively small amounts of antioxidants or stabilizers such as the conventional alkylated phenols. Alternatively, these may be added during or after polymerization. The formulation may also contain other additives such as plasticizers, lubricants, colorants and non-reactive preformed polymeric materials which are suitable or dispersible therein.

The Diene Rubber

The preferred rubbers are diene rubbers, including mixtures of diene rubbers, i.e., any rubbery polymer (a rubbery polymer having a second order transition temperature not higher than 0° centigrade, preferably not higher than −20° centigrade, as determined by ASTM Test D-746-52T of one or more of the conjugated, 1,3-dienes, e.g., butadiene, isoprene, 2-chloro-1,3 butadiene, 1 chloro-1,3 butadiene, piperylene, etc. Such rubbers include copolymers and block copolymers of conjugated 1,3-dienes with up to an equal amount by weight of one or more copolymerizable monoethylenically unsaturated monomers, such as monovinylidene aromatic hydrocarbons (e.g. styrene; an aralkylstyrene, such as the o-, m- and p-methylstyrenes, 2,4-dimethylstyrene, the arethylstyrenes, p-tertbutyl styrene, etc.; an alpha-methylstyrene, alphaethylstyrene, alpha-methyl-p-methyl styrene, etc.; vinyl naphthalene, etc.); arhalo monovinylidene aromatic hydrocarbons (e.g. the o-, m- and p-chlorostyrene, 2,4-dibromostyrene, 2-methyl-4-chlorostyrene, etc.); acrylonitrile; methacrylonitrile; alkyl acrylates (e.g. methyl acrylate, butyl acrylate, 2-ethylhexyl acrylate, etc.), the corresponding alkyl methacrylates; acrylamides (e.g. acrylamide, methacrylamide, N-butylacrylamide, etc.); unsaturated ketones (e.g. vinyl methyl ketone, methyl isopropenyl ketone, etc.); alpha-olefins (e.g., ethylene, propylene, etc.); pyridines; vinyl esters (e.g. vinyl acetate, vinyl stearate, etc.); vinyl and vinylidene halides (e.g. the vinyl and vinylidene chlorides and vinylidene chlorides and bromides, etc.); and the like.

A preferred group of rubbers are the stereospecific polybutadiene rubbers formed by the polymerization of 1,3 butadiene. These rubbers have a cis-isomer content of about 30–98% and a trans-isomer content of about 70–2% and generally contain at least about 85% of polybutadiene formed by 1,4-addition with no more than 15% by 1,2 addition. Mooney viscosities of the rubber (ML-4, 212° F.) can range from about 20 to 70 with a second order transition temperature of from about −50° C. to −105° C. as determined by ASTM Test D-746-52T.

The diene rubber used in preparing the grafted diene rubber is a crosslinked diene rubber of the type described above. The stereospecific polybutadiene rubbers are the most preferred for optimum physical properties of the polyblend.

Another preferred group of rubbers are those consisting essentially of 75 to 100% by weight of butadiene and/or isoprene and up to 25% by weight of a monomer selected from the group consisting of monovinylidene aromatic hydrocarbons (e.g. styrene) and unsaturated nitriles (e.g., acrylonitrile), or mixtures thereof. Particularly advantageous substrates are butadiene homopolymer or an interpolymer of 90 to 95% by weight butadiene and 5 to 10% by weight of acrylonitrile or styrene. The diene rubber may contain up to about 2% of a crosslinking agent based on the weight of the rubber monomer or monomers. The crosslinking agent can be of the agents conventionally employed for crosslinking diene rubbers, e.g., divinylbenzene, diallyl maleate, diallyl fumarate, diallyl adipate, allyl acrylate, allyl methacrylate, diacrylates and dimethacrylates of polyhydric alcohols, e.g., ethylene glycol dimethacrylate, etc.

EMULSION POLYMERIZATION PROCESS

In the emulsion polymerization grafting process, the monomers and rubber substrate are emulsified in water by use of suitable emulsifying agents, such as fatty acid soaps, alkali metal or ammonium soaps of high molecular weight, alkali or alkaryl sulfates and sulfonates, mineral acid salts of long chain aliphatic amines, etc. Emulsifying agents which have proven particularly advantageous are ammonium oleate, sodium palmitate, sodium stearate and other sodium soaps. Generally, the emulsifying agent is provided in amounts of from about 0.1 to 15 parts by weight per 100 parts by weight of the monomers and water is provided in an amount of from about 1 to 4 parts per part of monomers and even in larger ratios where greater dilution is desirable, all as those skilled in the art appreciate.

If desired, an aqueous latex formed in the emulsion polymerization of the rubber substrate may provide the aqueous solution onto which the monomers are grafted, with or without the addition of further emulsifying agents, water and the like.

Typical emulsion polymerization conditions involve temperatures in the range of from about 20° to 100° C. with agitation and preferably an inert atmosphere. Pressures of from about 1 to 100 pounds per square inch may be employed and monomers and/or additional catalysts may be added incrementally or continuously over a portion of the reaction cycle. Polymerization is preferably continued until substantially all, that is more than 90%, of the monomers have polymerized. The remaining monomers and other volatile components are then distilled away from the latex, preferable, which is then ready for further treatment.

Particle size of the emulsion latex graft particles may be varied by seeding, emulsifying agent concentration, agitation, rubber size variation through agglomeration prior to grafting, coagulation techniques, etc. Preferred agglomeration procedures are provided by Dalton's U.S. Pat. No. 3,558,541 and U.S. Pat. No. 3,551,370.

The particle size of the rubber has an effect upon the optimum grafting level for a graft copolymer. For example, a given weight percentage of smaller size rubber particles will provide considerably higher surface area for grafting than the equivalent weight of a larger size rubber particle. Accordingly, the density of grafting can be varied depending upon the size of the rubber particle. Generally, smaller graft polymer particles will tolerate a higher superstrate/substrate ratio than larger size particles.

The particle size of the emulsion rubber graft copolymer has a significant effect upon the gloss and physical properties of the product produced by the processes of this invention. Typically, the particle size of the graft copolymers used in the practice of the present invention may be varied from as little as about 0.01 microns to as large as about 1.0 microns and preferably from about 0.05 to 0.80 microns depending upon the ultimate properties desired for a given product. A most preferred rubber graft copolymer for use in the practice of this invention are graft copolymers having a weight average particle size of from about 0.2 to 0.7 microns for the grafted rubber.

For emulsion polymerization processes, the rubber desirably has a significant degree of crosslinking. With respect to the graft copolymers, at least some degree of crosslinking is inherent during the graft polymerization process and this desirably may be augmented through the addition of crosslinking agents or control of the polymerization conditions.

Such emulsion grafted rubber particles can exist in particle size distributions known as bimodal particle size distributions, i.e., 50 to 95% by weight of the particles have an average particle size of about 0.05 to 0.40 microns and 5 to 50% of the particles have an average particle size of about 0.50 to 5.0 microns or larger.

The dispersed rubber phase increases the toughness of the new type polymeric polyblend as measured by its Izod impact strength by Test ASTM D-256-56. It has been found that the impact strength of polyblends increase with the weight percent rubber dispersed in the polyblend as used in the present invention. The impact strength is also determined by the size of the dispersed rubber particles, with the larger particles providing higher impact strength measured as a weight average particle size diameter with a photosedimentometer by the published procedure of Graves, M. J. et. al., "Size Analysis of Subsieve Powders Using a Centrifugal Photosedimentometer," British Chemical Engineering 9:742-744 (1964). A Model 3000 Particle Size Analyzer from Martin Sweets Co., 3131 West Market Street, Louisville, Ky. was used.

The product of the emulsion grafting process is the diene rubber particles grafted with a portion of the monomers charged to the rubber latex. In addition, the monomers form a terpolymer of said monomers as a matrix phase. The grafted monomers form a superstrate on the diene rubber particles as a substrate when the monomers are grafted with water soluble catalysts.

Although the amount of polymeric superstrate grafted onto the rubber substrate may vary from as little as 10.0 parts by weight to 100.0 parts of substrate to as much as 250.0 per 100.0 parts and even higher, the preferred graft copolymers will generally have a superstrate to substrate ratio of about 20 to 200:100 and most desirably about 30 to 150:100. With graft ratios about 30 to 150:100, a highly desirable degree of improvement in various properties generally is obtained.

Such surface or superstrate grafting causes the rubber particles to disperse readily in the matrix phase terpolymers when melt colloided during extrusion. In addition, the superstrate provides a compatible interface with the matrix phase to increase toughness or impact strength.

As taught supra the larger the amount of the rubber moiety in a polyblend the tougher the polyblend with ABS polyblends containing 2 to 50% of said rubber moiety depending on toughness desired.

The aqueous latex charged in step (A) contains about 20 to 60% of emulsified diene rubber particles have a rubber particle size of about 0.01 to 0.5 microns. The matrix polymer phase forming during polymerization has a molecular weight of about 50,000 to 500,000. The diene rubber particles after grafting and the matrix polymer formed can be separated from the aqueous emulsion by coagulation with inorganic salts such as $MgSO_4$, $Al_2(SO_4)_3$ or acids such as acetic, hydrochloric or sulfuric used in amounts sufficient to stoichometrically neutralize the emulsify agents and cause coagulation. The grafted rubber particles and the matrix polymer particles will form a coagulated crumb which separate from the aqueous phase of the latex and can be easily removed by filtration, decanting or centrifuging followed by washing and drying. As disclosed, the matrix polymer phase formed during emulsion polymerization cocoagulates with the rubber particles as part of the coagulate forming an intimate mixture as an ABS polyblend of grafted rubber particles and matrix polymer particles. The melt extrusion of such blends can further colloidally disperse the grafted rubber particles in the matrix phase polymer as an ABS polyblend.

Another suitable method for separating said grafted rubber particles and said matrix phase from said latex is to mix additional monomer formulation into said latex after grafting in amounts sufficient to extract said grafted rubber particles and said matrix polymer particles into said additional monomer formulation as a liquid monomer phase and removing said liquid monomer phase from the aqueous phase of said latex by decanting or centrifugation.

The ratio of the additional monomer used for extraction to the weight of grafted rubber particles and matrix phase polymer in the latex can be about 2 to 1 to 5 to 1 by weight. The higher the amount of monomers used the less viscous is the liquid monomer phase formed and the more readily it separates from the aqueous phase of the latex. Improved dewatering of the liquid monomer phase can be carried out by adding inorganic salts or acids to the latex to deemulsify the grafted rubber particles and matrix phase particles so that water is not occluded with the particles as extracted into the monomer phase. Said liquid monomer phase can be mass polymerized thermally or with said monomer-soluble catalysts at temperatures of 100° to 180° C. to completion or to conversions of 50 to 90% followed by conventional devolatilization of the residual monomers providing the new polyblend with additional matrix phase polymers. Such mass polymerization can be carried out in stirred reactors, in plug flow towers or tubular reactors. U.S. Pat. No. 3,751,010 discloses a stirred horizontal, evaporatively cooled reactor which is suitable for the mass polymerization of said liquid monomer phase to form new polyblends.

ALKYL ACRYLATE MONOMERS

The alkyl acrylate monomers are those selected from the alkyl group consisting of $C_1$–$C_{12}$ alkyl acrylates, e.g., methyl, ethyl, propyl, butyl, pentyl, hexyl, ethyl hexyl, heptyl, octyl, nonyl, decyl, dodecyl.

The preferred alkyl acrylate monomers are $C_4$–$C_{10}$ alkyl esters of acrylic acid. The alkyl acrylates are present in said monomer formulation in amounts of about 1 to 20% by weight based on said monomer formulation.

It has been discovered that the toughness of polyblends having small rubber particles in the range of about 0.01 to 0.25 microns can be increased by incorporation of alkyl acrylates in the monomer formulation used to graft the rubber and prepare the matrix phase polymer. Here, the elongation to fail can be increased as much as 300% and the multiaxial impact strength by as much as 200%.

The technical advance is one of being able to increase the toughness of such polyblends yet maintain very high gloss through the small rubber particles. The present invention allows the use of small rubber particles for gloss without incorporating large particles for toughness with loss of gloss.

The following examples are illustrative of the present process and are not meant to limit the scope or spirit of the invention.

EXAMPLE 1

To a 250.0 parts of a latex of butadiene/acrylonitrile copolymer (93:7) containing 50.0 percent solids and with a gel content of about 75% approximately 1.0 part of rubber reserve soap as an emulsifier were added 70.0 parts water, 1.0 part rubber reserve soap and 1.0 part potassium persulfate.

This emulsion was heated to 65° centigrade with stirring and then there were added thereto over a period of about six hours 140.0 parts styrene, 60.0 parts acrylonitrile and 3.0 parts of terpinolene. The emulsion was held at temperature for one hour thereafter with stirring, cooled, coagulated by the addition of magnesium sulfate and the coagulant was then washed and dried. The resulting graft copolymer has a superstrate to substrate ratio of about 0.9:1.0 and a rubber particle size of about 0.25 micron.

EXAMPLES 2–8

Example 1 was repeated adding butyl acrylate to the monomer formulation such that the graft polyblend had the desired designated weight percent of the butyl acrylate desired as shown in Table I. The graft polyblends formed had about 38% rubber and were diluted to 22% rubber for test purposes using styrene-acrylonitrile copolymer (70/30). The resulting blend was extruded into 30 mil sheet.

TABLE I

| Ex. | Wgt. % Acrylate | Type of Acrylate | Elongation at Fail % | Failure Mode | Multiaxial Impact Strength |
|---|---|---|---|---|---|
| 1 | 0 | — | 11 | Brittle | 15 |
| 2 | 4.5 | Butyl | 28 | Ductile | 17 |
| 3 | 14.5 | Butyl | 34 | Ductile | 28 |
| 4 | 21.0 | Butyl | 42 | Ductile | 38 |

TABLE I-continued

| Ex. | Wgt. % Acrylate | Type of Acrylate | Elongation at Fail % | Failure Mode | Multiaxial Impact Strength |
|---|---|---|---|---|---|
| 5 | 5.0 | Octyl | 31 | Ductile | 25 |
| 6 | 10.0 | Octyl | 43 | Ductile | 43 |
| 7 | 5.0 | Decyl | 25 | Ductile | 21 |
| 8 | 10.0 | Decyl | 36 | Ductile | 34 |

It is evident from these data, that the optimum properties are obtained with the octyl acrylate, however, the range of properties using $C_4$ to $C_{10}$ alkyl esters of acrylic acid provide superior toughness.

What is claimed is:
1. A terpolymer polyblend composition comprising:
   A. a matrix phase terpolymer of alkenyl aromatic, alkenyl nitrile and alkyl acrylate monomers,
   B. a diene rubber phase grafted with said monomers as graft terpolymer and dispersed in said matrix phase as rubber particles having an average particle size of about 0.2 to 0.7 microns, said matrix and graft terpolymers having present about 1 to 15% by weight of said alkyl acrylate monomer,
   C. said terpolymer polyblend having high gloss and ductility in formed articles, said diene rubber being a polybutadiene rubber, said terpolymer polyblend being prepared by the emulsion polymerization of said monomers in the presence of said rubber particles.
2. A composition of claim 1 wherein said alkenyl aromatic monomer is styrene, alpha-methyl styrene, chlorostyrene, bromostyrene, aralkyl styrene and arhaloalkyl styrene or mixtures thereof.
3. A composition of claim 1 wherein said alkenyl nitrile monomer is acrylonitrile, metha-acrylonitrile, ethyl-acrylonitrile or mixtures thereof.
4. A composition of claim 1 wherein said alkenyl acrylate monomer is selected from the group of $C_1$–$C_{12}$ alkyl acrylates.
5. A composition of claim 1 wherein said alkyl acrylate is butyl acrylate.
6. A terpolymer polyblend composition comprising:
   A. a matrix phase terpolymer of alkenyl aromatic, alkenyl nitrile and alkyl acrylate monomers,
   B. a diene rubber phase grafted with said monomers as graft terpolymer and dispersed in said matrix phase as rubber particles having an average particle size of about 0.2 to 0.7 microns, said matrix and graft terpolymers having present about 1 to 15% by weight of said alkyl acrylate monomer,
   C. said terpolymer polyblend having high gloss and ductility in formed articles, said diene rubber being a polybutadiene rubber, said terpolymer polyblend being prepared by the emulsion polymerization of said monomers in the presence of said rubber particles and said terpolymer polyblend having present a copolymer of said alkenyl aromatic and alkenyl nitrile monomers in an amount up to about 50% by weight of said matrix phase.

* * * * *